July 14, 1925.
P. H. PAETZOLD
GREASE GUN CARTRIDGE
Filed Dec. 19, 1922
1,546,307
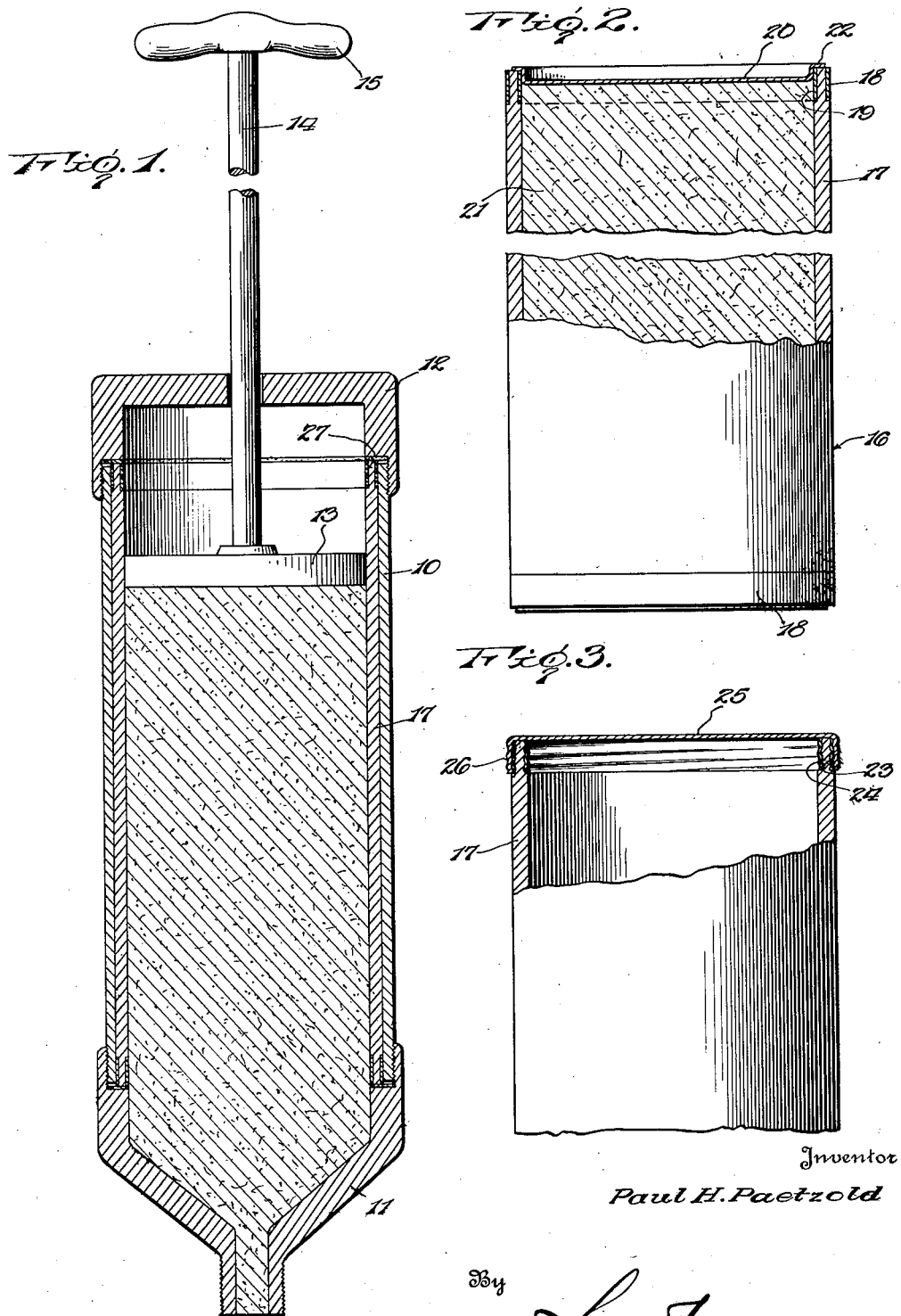
Inventor
Paul H. Paetzold
By
Attorneys Patented July 14, 1925.

1,546,307

UNITED STATES PATENT OFFICE.

PAUL H. PAETZOLD, OF MILWAUKEE, WISCONSIN.

GREASE-GUN CARTRIDGE.

Application filed December 19, 1922. Serial No. 607,855.

*To all whom it may concern:*

Be it known that I, PAUL H. PAETZOLD, a citizen of the United States, residing at Milwaukee, in the county of Milwaukee and State of Wisconsin, have invented certain new and useful Improvements in Grease-Gun Cartridges, of which the following is a specification.

This invention relates to a device for filling so-called grease guns and the object of the invention is to provide a container or cartridge, which is filled with a lubricant and sealed for transportation and has such dimensions as to fit a grease gun and to contain an exact amount of lubricant for the latter.

The advantage of furnishing a cartridge of this character is, that it affords a considerable saving in grease and is clean in handling. Furthermore, it is a considerable time saver as the desired quantity of grease to fill the gun is right at hand to put into the same instead of the tedious operation of gradually filling it from a large receptacle.

The cartridges are manufactured in different sizes for holding different amounts of grease in accordance with the diameter and length of the grease guns for which they are intended.

It is evident that the device may be applied to uses other than grease guns and filled with other gelatinous or viscous material such as soap, vaseline, and the like.

In the accompanying drawings one embodiment of the invention is illustrated and;

Figure 1 is a longitudinal section of a grease gun loaded with the cartridge forming the subject matter of the present invention.

Figure 2 is a side elevation and partial section of the cartridge, and

Figure 3 is a similar view to Figure 2, of a slightly modified form of the invention.

In the drawing reference numeral 10 presents the sleeve like body of a grease gun, which is provided with a nozzle 11 screwed on the body 10, and a head 12 similarly screwed on the body 10 at the opposite end thereof. This head 12 has a central opening forming a bearing for the shank 14 of the plunger 13, which shank has a terminal handle 15. The diameter of the plunger 13 is the same as the chamber diameter of the nozzle 11 or the head 12, but the internal diameter to the sleeve in body 10 is slightly greater, so that room is provided for the walls of the cartridge within the sleeve.

The cartridge 16 consists of a hollow cylinder or shell 17 preferably made of cardboard or fibre suitably impregnated or treated, so as to make it oil-proof. The thickness of the walls of the shell 17 is equal to the difference of the inside diameters of the sleeve 10 and the head 12, so that when the cartridge is inserted in the gun, the plunger will fit snugly in the shell 17.

Each end of the shell is provided with reinforcement consisting of a thin annular metallic band 18 clamped or threaded on the outside of the shell, as seen in Figure 2. Similarly internal reinforcements 19 are provided at each end of the cartridge fitting tightly therein.

When the reinforcements have smooth surfaces, a dished cap 20 is provided for each end to close the cartridge after it has been filled with grease as at 21 and this cap has preferably an annular flange 22, adapted to rest on the end of the cartridge, when the cap is in position.

In case the reinforcements 23 and 24 have threaded engagements with the ends of the shell 17, as seen in Figure 3 of the drawing, a somewhat different cap 25 is provided. This cap has an annular rim 26, which is threaded to fit the outer reinforcement 23 and the caps 25 are accordingly screwed on the ends of the cartridges after they have been filled.

The over all length of the shell 17 is slightly greater, than the length of the sleeve 10 in the grease gun, so that when the grease gun is assembled together with a cartridge, the nozzle and head of the grease gun abut against the ends of the shell 17, so as to make tight joints at these places. In order to insure still greater tightness at the joints a small washer 27 of leather or rubber is preferably inserted in the nozzle and head of the grease gun, as seen in Figure 1, so that when the cartridge is inserted its ends will rest on these washers and prevent any leakage of grease through the joints.

The cartridges are filled with the exact quantity of grease required for the grease gun and sealed by the caps 20 or 25, depending upon which construction of the ends for the cartridges has been used, and the cartridges are then ready for shipment from the factory to the machine shop where they are to be used.

Before inserting a cartridge in the grease gun both end caps have to be removed. That is to say, after either the nozzle 11 or the head 12 has been removed from the grease gun, the best way probably being to leave the nozzle 11 in position and unscrew the head 12 together with a plunger 13; one of the end caps 20 or 25 is taken off the cartridge and the latter then pushed into the sleeve 10 of the grease gun, with the open end towards the nozzle. When the cartridge is entered far enough in the sleeve, the other cap is then removed whereupon the head 12 is again replaced on the open end of the grease gun and screwed down tightly, with the ends of the cartridge leaving a small space between the ends of the sleeve 10, and the head 12, and the nozzle 11 respectively. It is evident that the plunger 13 during this assembling of the parts should have been retracted into the chamber of the head 12 and the gun is now ready for use and the grease can be squirted into the bearings where needed, by pushing the plunger forward in the grease gun. As soon as the plunger has made a full stroke the gun is ready for another charge, when it is opened as already described and the second cartridge inserted in the same manner.

Having thus described the invention what is claimed as new is:

A cartridge for grease guns comprising an open-ended shell of fibrous material, relatively narrow reinforcing rings embedded respectively in the internal and external circumferential surfaces of the shell at the ends thereof and flush with said surfaces, the outer ends of the rings being disposed flush with the corresponding ends of said cylindrical shell leaving the fibrous material between said rings at the ends of the shell exposed, and removable metallic closures fitted to the ends of the shell and bearing against the exposed portions of the fibrous material between the rings for preventing leakage of the contents of the cartridge.

In testimony whereof I affix my signature.

PAUL H. PAETZOLD.